US008731062B2

(12) United States Patent
Kanumuri et al.

(10) Patent No.: US 8,731,062 B2
(45) Date of Patent: May 20, 2014

(54) NOISE AND/OR FLICKER REDUCTION IN VIDEO SEQUENCES USING SPATIAL AND TEMPORAL PROCESSING

(75) Inventors: Sandeep Kanumuri, Sunnyvale, CA (US); Onur G. Guleryuz, San Francisco, CA (US); M. Reha Civanlar, Palo Alto, CA (US); Akira Fujibayashi, Kanagawa (JP); Choong S. Boon, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1251 days.

(21) Appl. No.: 12/233,468

(22) Filed: Sep. 18, 2008

(65) Prior Publication Data
US 2009/0195697 A1    Aug. 6, 2009

Related U.S. Application Data

(60) Provisional application No. 61/026,453, filed on Feb. 5, 2008.

(51) Int. Cl.
H04B 1/66 (2006.01)
H04N 7/12 (2006.01)
H04N 11/02 (2006.01)
H04N 11/04 (2006.01)

(52) U.S. Cl.
USPC .................. 375/240.2; 375/240.02; 375/241

(58) Field of Classification Search
USPC ................................... 375/240–241
See application file for complete search history.

(56) References Cited

U.S. PATENT DOCUMENTS

| | | | |
|---|---|---|---|
| 4,442,454 A | 4/1984 | Powell | |
| 4,447,886 A | 5/1984 | Meeker | |
| 5,666,209 A | 9/1997 | Abe | |
| 5,844,611 A | 12/1998 | Hamano et al. | |
| 5,859,788 A | 1/1999 | Hou | |
| 6,141,054 A | 10/2000 | Lee et al. | |
| 6,438,275 B1 | 8/2002 | Martins et al. | |
| 7,284,026 B2 | 10/2007 | Nakayama | |
| 7,554,611 B2 * | 6/2009 | Zhou et al. | 348/701 |
| 2002/0028025 A1 | 3/2002 | Hong | |
| 2005/0030393 A1 | 2/2005 | Tull | |
| 2006/0050783 A1 * | 3/2006 | Le Dinh et al. | 375/240.2 |
| 2007/0074251 A1 * | 3/2007 | Oguz et al. | 725/45 |

(Continued)

FOREIGN PATENT DOCUMENTS

| | | |
|---|---|---|
| CN | 1665298 A | 9/2005 |
| CN | 1997104 A | 7/2007 |

(Continued)

OTHER PUBLICATIONS

"Warped Discrete Cosine Transform and Its Application in Image Compression", Cho et al, IEEE transactions on Circuits and Systems for Video Technology, vol. 10, No. 8, Dec. 2000.*

(Continued)

*Primary Examiner* — Benjamin H Elliott, IV
(74) *Attorney, Agent, or Firm* — Blakely, Sokoloff, Taylor & Zafman LLP

(57) ABSTRACT

A method and apparatus are disclosed herein for reducing at least one or both of flicker and noise in video sequences. In one embodiment, the method comprises receiving an input video and performing operations to reduce one or both of noise and flicker in the input video using spatial and temporal processing.

35 Claims, 11 Drawing Sheets

(56) References Cited

U.S. PATENT DOCUMENTS

| | | | |
|---|---|---|---|
| 2007/0160304 A1 | 7/2007 | Berkner et al. | |
| 2007/0299897 A1 | 12/2007 | Reznik | |
| 2008/0246768 A1* | 10/2008 | Murray et al. | 345/427 |
| 2009/0046995 A1 | 2/2009 | Kanumuri et al. | |
| 2009/0060368 A1 | 3/2009 | Drezner et al. | |
| 2009/0195697 A1* | 8/2009 | Kanumuri et al. | 348/607 |

FOREIGN PATENT DOCUMENTS

| | | |
|---|---|---|
| EP | 1531424 | 5/2005 |
| JP | 06/054172 | 2/1994 |
| JP | 08-294001 | 11/1996 |
| JP | 10-271323 | 10/1998 |
| WO | WO 2006/127546 A2 | 11/2006 |
| WO | 2007089803 A2 | 8/2007 |
| WO | WO 2009/100034 | 8/2009 |

OTHER PUBLICATIONS

Gupta N. et al.: "Wavelet domain-based video noise reduction using temporal discrete cosine transform and hierarchically adapted thresholding", IET Image Processing, vol. 1, No. 1, Mar. 6, 2007, pp. 2-12, XP006028283.*

Gupta, N., et al., "Wavelet Domain-Based Video Noise Reduction Using Temporal Discrete Cosine Transform and Hierarchically Adapted Thresholding", IET Image Processing, Mar. 6, 2007, pp. 2-12, vol. 1—No. 1.

Foi, Alessandro, et al., "Shape-Adaptive DCT for Image Denoising and Image Reconstruction", Image Processing: Algorithms and Systems, Neural Networks, and Machine Learning-Proceedings of SPIE—IS&T Electronic Imaging, Jan. 16, 2006, pp. 1-12, vol. 6064, Bellingham, WA, USA.

Motwani, Mukesh C., et al., "Survey of Image Denoising Techniques", Proceedings of the Global Signal Processing Expo and Conference, Sep. 27, 2004, pp. 1-8.

PCT International Search Report for PCT Patent Application No. PCT/US09/32888, dated Jun. 25, 2009, 4 pages.

PCT Written Opinion of the International Searching Authority for PCT Patent Application No. PCT/US09/32888, dated Jun. 25, 2009, 7 pages.

Office Action mailed Oct. 27, 2011 for U.S. Appl. No. 12/140,829, filed Jun. 17, 2008, 30 pages.

Final Office Action mailed May 2, 2012 for U.S. Appl. No. 12/140,829, filed Jun. 17, 2008, 30 pages.

Office Action mailed May 30, 2012 for U.S. Appl. No. 12/239,195, filed Sep. 26, 2008, 9 pages.

Final Office Action mailed Nov. 5, 2012 for U.S. Appl. No. 12/239,195, filed Sep. 26, 2008, 9 pages.

Japanese Office Action for related Japanese Patent Application No. 2011-514565, Sep. 18, 2012, 4 pages.

International Preliminary Report on Patentability for PCT Patent Application No. PCT/US2008/073203, Dec. 29, 2010, 8 pages.

Boon, Choong S., et al., "Sparse super-resolution reconstructions of video from mobile devices in digital TV broadcast applications", Proceedings of SPIE, Aug. 31, 2006, XP-002525249, pp. 63120M-1-63120M-12, vol. 6312.

Guleryuz, Onur G., "Predicting Wavelet Coefficients Over Edge Using Estimates Based on Nonlinear Approximants", Data Compression Conference 2004, Snowbird, Utah, Mar. 23, 2004, pp. 162-171.

Seunghyeon, Rhee, et al., "Discrete cosine transform based regularized high-resolution image reconstruction algorithm", Optical Engineering, SPIE, vol. 38, No. 9, Aug. 1999, XP-002525250, pp. 1348-1356.

Guleryuz, Onur G., "Nonlinear Approximation Based Image Recovery Using Adaptive Sparse Reconstructions and Iterated Denoising—Part I: Theory", IEEE Trans. on Image Processing, Mar. 2006, vol. 15, No. 3, XP-002525251, pp. 539-554.

Guleryuz, Onur G., "Nonlinear Approximation Based Image Recovery Using Adaptive Sparse Reconstructions and Iterated Denoising—Part II: Adaptive Algorithms", IEEE Trans. on Image Processing, Mar. 2006, vol. 15, No. 3, XP-002525252, pp. 555-571.

Jiji, C.V., et al., "Single frame image super-resolution: should we process locally or globally?", Multidimensional Systems and Signal Processing, Mar. 6, 2007, vol. 18, No. 2-3, pp. 123-152.

Park, Min Kyu, et al., "Super-Resolution Image Reconstruction: A Technical Overview", IEEE Signal Processing Magazine, May 1, 2003, vol. 20, No. 3, pp. 21-36.

Hunt, B.R., et al., "Super-Resolution of Images: Algorithms, Principles, Performance", International Journal of Imaging Systems and Technology, Dec. 21, 1995, vol. 6, No. 4, XP-001108818, pp. 297-304.

International Search Report for PCT Patent Application No. PCT/US2008/073203, dated Jul. 17, 2009, 4 pages.

Written Opinion of the International Searching Authority for PCT Patent Application No. PCT/US2008/073203, dated Jul. 17, 2009, 8 pages.

ITU-Recommendation H.264 & ISP/IEC 14496-10 (MPEG-4) AVC, "Advanced Video Coding for Generic Audiovisual Services", version 3, 2005, 282 pages.

Vatis, Y., et al., "Locally Adaptive Non-Separable Interpolation Filter for H.264/AVC", IEEE ICIP, Oct. 2006, 4 pages.

International Preliminary Report on Patentability for PCT Patent Application No. PCT/US2009/032888, Aug. 19, 2010, 7 pages.

Korean Office Action for related Korean Patent Application No. 2010-7017838, Jun. 29, 2012, 5 pages.

Chinese Office Action for related Chinese Patent Application No. 200980103952.3, Jul. 9, 2012, 6 pages.

Notification of Transmittal of International Search Report and the Written Opinion for PCT Patent Application No. PCT/US2009/032890, Sep. 10, 2012, 5 pages.

Written Opinion of the International Searching Authority for PCT Patent Application No. PCT/US2009/032890, Sep. 10, 2012, 10 pages.

Rusanovsky, et al., "Video Denoising Algorithm in Sliding 3D DCT Domain", Advanced Concepts for Intelligent Vision Systems Lecture Notes in Computer Science, Springer. Berlin, DE. XP019019728. ISBN: 978-3-540-29032-2; Sections 2-3; Jan. 1, 2005, pp. 618-625.

Katkovnik, et al., "Mix-Distribution Modeling for Overcomplete Denoising", 9th IFAC Workshop on Adaptation and Learning in Control and Signal Processing, Jan. 1, 2007, vol. 9, pp. 1-6.

Yaroslavsky, "Local Adaptive Image Restoration and Enhancement with the Use of DFT and DCT in a Running Window", Proceedings of SPIE, Jan. 1, 1996, vol. 2825, pp. 2-13.

Yaroslavsky, et al., "Transform Domain Image Restoration Methods: Review, Comparison, and Interpretation", Proceedings of SPIE, Jan. 1, 2001, vol. 4304, pp. 155-169.

Mozafari, et al., "An Efficient Recursive Algorithm and an Explicit Formula for Calculating Update Vectors of Running Walsh-Hadamard Transform", IEEE 9th International Symposium on Signal Processing and its Applications, Feb. 12, 2007, pp. 1-4.

Kober, "Fast Algorithms for the Computation of Sliding Discrete Sinusoidal Transforms", IEEE Transactions on Signal Processing, Jun. 1, 2004, vol. 52, No. 6, 8 pages.

International Preliminary Report on Patentability for PCT Patent Application No. PCT/US2009/032890, Sep. 25, 2012, 9 pages.

Notification Concerning Transmittal of International Preliminary Report on Patentability for PCT Patent Application No. PCT/US2009/032890, Oct. 4, 2012, 10 pages.

Chinese Office Action for related Chinese Patent Application No. 200980103952.3, Jan. 4, 2012, 13 pgs. English Translation.

Korean Office Action for related Korean Patent Application No. 2010-7017838, Nov. 16, 2011, 6 pgs. English Translation.

Hong, et al., "Image Compression Technology and Techniques", Apr. 1988, 31 pgs., Sensory Intelligence Group, Robot Systems Division, National Bureau of Standards, Gaithersberg, MD 20899.

Kanumuri, et al., "Fast super-resolution reconstructions of mobile video using warped transforms and adaptive thresholding", DoCoMo Communications Laboratories USA, Inc. Palo Alto, CA 94304, 2007.

(56) References Cited

OTHER PUBLICATIONS

Seo, Hae Jong, et al., "Video Denoising Using Higher Order Optimal Space-Time Adaptation," IEEE: ICASSP 2008, pp. 1249-1252, 2008.

Guleryuz, Onur G., "Weighted Averging for Denoising with Overcomplete Dictionaries," pp. 1-24, 2007.

Naranjo, Valery, et al., "Flicker Reduction in Old Films," Proceedings of the International Conference on Image Processing, 2000, pp. 657-659.

Becker, A., et al., "Flicker Reduction in Intraframe Codecs," Proceedings of the Data Compression Conference, 2004, pp. 252-261.

Dabov, Kostadin, et al., "Video Denoising by Sparse 3D Transform-Domain Collaborative Filtering," Proceedings of the 15th European Signal Processing conference, 2007.

Abbas, Houssam, et al., "Suppression of Mosquito Noise by Recursive Epsilon-Filters," IEEE: ICASSP 2007, pp. 773-776.

Kuszpet, Yair, et al., "Post-Processing for Flicker Reduction in H.264/AVC," 4 pages, 2007.

Protter, Matan, et al., "Sparse and Redundant Representations and Motion-Estimation-Free Algorithm for Video Denoising," 12 pages, 2007.

\* cited by examiner (K)  (L)  (M)

NOISE AND/OR FLICKER REDUCTION IN VIDEO SEQUENCES USING SPATIAL AND TEMPORAL PROCESSING

PRIORITY

The present patent application claims priority to and incorporates by reference the corresponding provisional patent application Ser. No. 61/026,453, titled, "Flicker Reduction in Video Sequences Using Temporal Processing," filed on Feb. 5, 2008.

RELATED APPLICATIONS

This application is related to the co-pending application entitled "Image/Video Quality Enhancement and Super-Resolution Using Sparse Transformations," filed on Jun. 17, 2008, U.S. patent application Ser. No. 12/140,829, assigned to the corporate assignee of the present invention.

FIELD OF THE INVENTION

The present invention relates generally to processing of video sequences; more particularly, the present invention is related to reducing noise and/or flicker in video sequences.

BACKGROUND OF THE INVENTION

Mosquito noise and temporal flicker are caused during acquisition due to camera limitations. Modules in the video processing pipeline such as compression, downsampling and upsampling lead to blocking artifacts, aliasing, ringing and temporal flicker. Image and video signal processing is widely used in a number of applications today. Some of these techniques have been used to reduce noise and temporal flicker.

SUMMARY OF THE INVENTION

A method and apparatus is disclosed herein for reducing at least one of both flicker and noise in video sequences. In one embodiment, the method comprises receiving an input video and performing operations to reduce one or both of noise and flicker in the input video using spatial and temporal processing.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
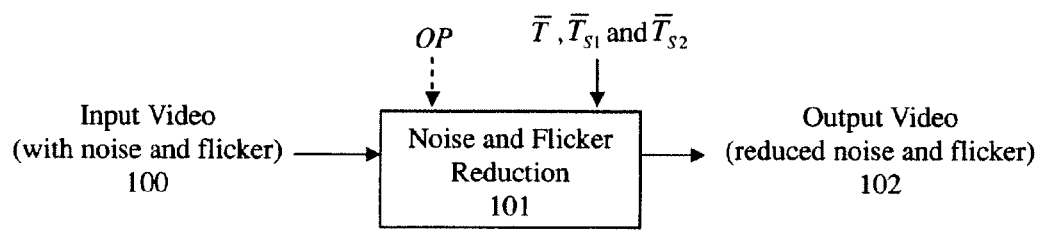
FIG. 1 illustrates one embodiment of a noise and flicker reduction module to reduce noise and/or flicker in an input video.

A method and apparatus for noise and/or flicker reduction in compressed/uncompressed video sequences are described. For purposes herein, a video sequence is made up of multiple images referred to herein as frames placed in order.

In one embodiment, the techniques disclosed herein include, but are not limited to: selecting a sub-frame at certain pixels from the current frame of input video and finding another sub-frame from the past frame of output video that satisfies a criterion; selecting a pixel-adaptive warped spatial transform and transforming the sub-frames into a spatial transform domain; deriving a detail-preserving adaptive threshold and thresholding the transform coefficients of the sub-frames from the current frame and the past frame using hard thresholding (set to zero if magnitude of transform coefficients is less than the threshold) or other thresholding techniques such as soft-thresholding; further transforming the spatial-transform coefficients using a temporal transform and thresholding a selected sub-set of the temporal-transform coefficients; inverse transforming the temporal-transform coefficients first temporally and then spatially to get the processed sub-frames belonging to both current frame and past frame; and combining the processed sub-frames belonging to current frame from input video to obtain the current frame for output video. These operations can be repeated for all the frames of the input video.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1A illustrates one embodiment of a noise and flicker reduction module to reduce noise and/or flicker in an input video. Referring to FIG. 1A, noise and flicker reduction block 101 receive input video 100. Input video 100 includes noise and/or flicker. Noise and flicker reduction block 101 also receives a vector of optional parameters, referred to herein as OP, and threshold parameters $\overline{T}$, $T_{S1}$, $T_{S2}$. In response to these inputs, noise and flicker reduction block 101 generates output video 102 with reduced noise and flicker.

Figure 1B:
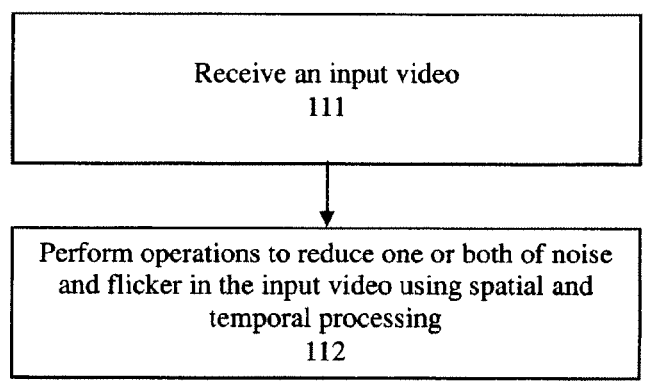

FIG. 1B illustrates a flow diagram of one embodiment of a process for performing image processing on a video sequence. The process is performed by processing logic that may comprise hardware (circuitry, dedicated logic, etc.), software (such as is run on a general purpose computer system or a dedicated machine), or a combination of both.

Referring to FIG. 1B, the process begins with processing logic receiving an input video (processing block 111).

In response to receiving the input video, processing logic performs operations to reduce one or both of noise and flicker in the input video using spatial and temporal processing (processing block 112). In one embodiment, these operations include applying a spatial transform and a temporal transform with adaptive thresholding of coefficients. In one embodiment, applying the spatial transform and the temporal transform comprises applying at least one warped transform to a sub-frame to create transform coefficients.

Figure 2:
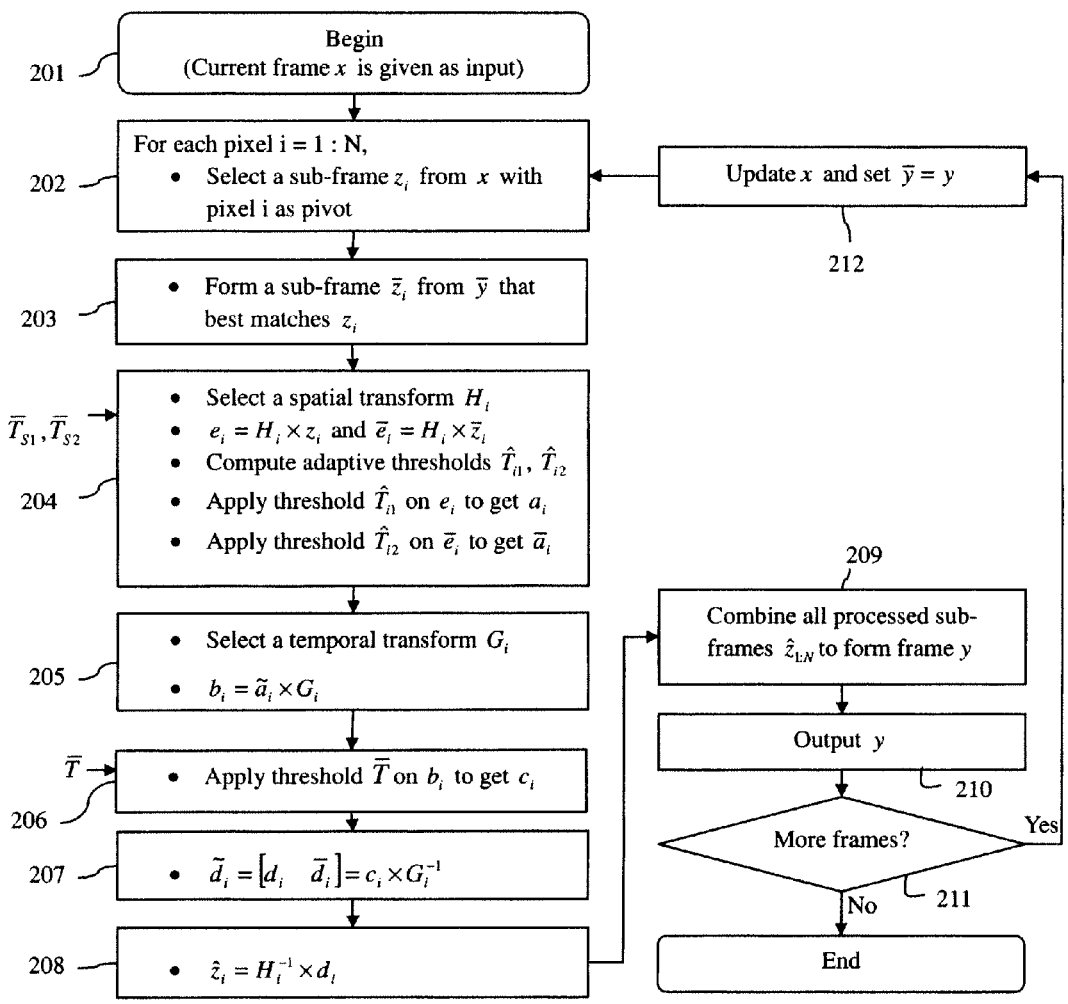
FIG. 2 illustrates a flow diagram of one embodiment of a process for performing image processing on a video sequence.

FIG. 2 illustrates a more detailed flow diagram of one embodiment of a process for performing image processing on a video sequence. The process is performed by processing logic that may comprise hardware (circuitry, dedicated logic, etc.), software (such as is run on a general purpose computer system or a dedicated machine), or a combination of both.

In the process described below, x denotes the current frame from the input video that is being processed by the techniques described herein, $\overline{y}$ denotes the past frame output after using the techniques described herein and T, $T_{S1}$, $T_{S2}$ denote threshold parameters used by the image processing process. Furthermore, a vector denoted by OP, containing other optional parameters, can be supplied. The user or an algorithm can determine the most desired parameters using optimization of subjective/objective quality, using model based techniques, or using other methods. Calibration algorithms can also be used. Such algorithms can also take advantage of partial/complete knowledge of either the video processing pipeline or the input video or both. In one embodiment, all video frames are represented as vectors by arranging the pixels in raster-scan order and N represents the number of pixels in each video frame.

Figure 4:
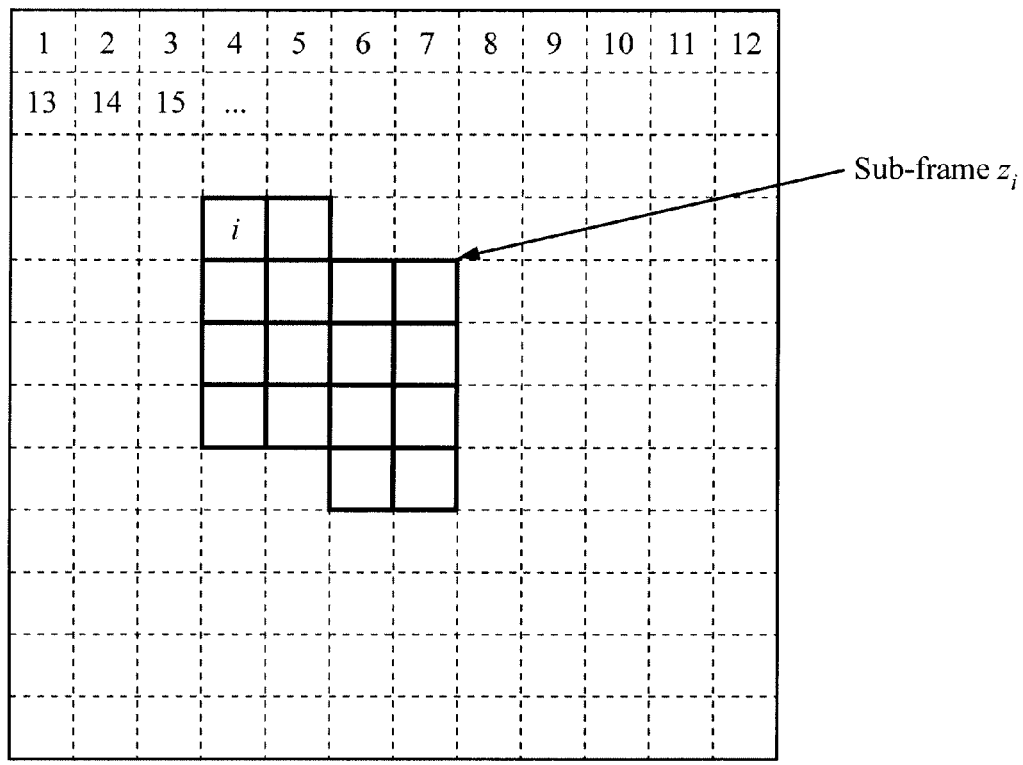
FIG. 4 shows an example sub-frame at pixel i when pixels are number in raster-scan order.

After frame x has been obtained (processing block 201), the sub-frame selection process of processing block 202 of FIG. 2 begins. A sub-frame type S is defined as an $M^2 \times 1$ integer-valued vector. For purposes herein, M can be any integer greater than zero. $\{S^1, S^2, S^3, \ldots\}$ is a library of sub-frame types. For each pixel i in a set of selected pixels from frame x where pixels are numbered in raster-scan order, a sub-frame type s, is selected from the library and a vector $p_i$ is formed as $p_i = s_i + i \times \overline{1}$, where $\overline{1}$ is an $M^2 \times 1$ vector with all elements equal to 1. In one embodiment, for pixels that are not selected, $p_i$ is a vector of zeros. The set of selected pixels can be predetermined or signaled within the vector OP. In this embodiment, a sub-frame is formed and processed for each pixel in the image. That is, the set of selected pixels is the entire set of pixels in the frame. However, in another embodiment, the processing may be performed only on a selected subset of the pixels and not on all the pixels in the image. The subset may be predetermined or signaled as part of the side-information. FIGS. 13A-E illustrate examples of such subsets; other subsets may be used with the teachings described herein. An $M^2 \times 1$ vector z, called a sub-frame is formed with pixel values of frame x at locations corresponding to elements of $p_i$. Pixel i is called the pivot for sub-frame $z_i$. FIG. 4 shows an example sub-frame $z_i$ at pixel i when pixels are numbered in raster-scan order. Referring to FIG. 4, the raster-scan ordering of pixels occurs by numbering pixels starting from "1" in that order. A sub-frame is shown pivoted at pixel i. A sub-frame is organized into M vectors called warped rows. The first warped row has the sub-frame elements 1 to M in that order; the second warped row has the elements (M+1) to 2M; and so on.

Figure 3:
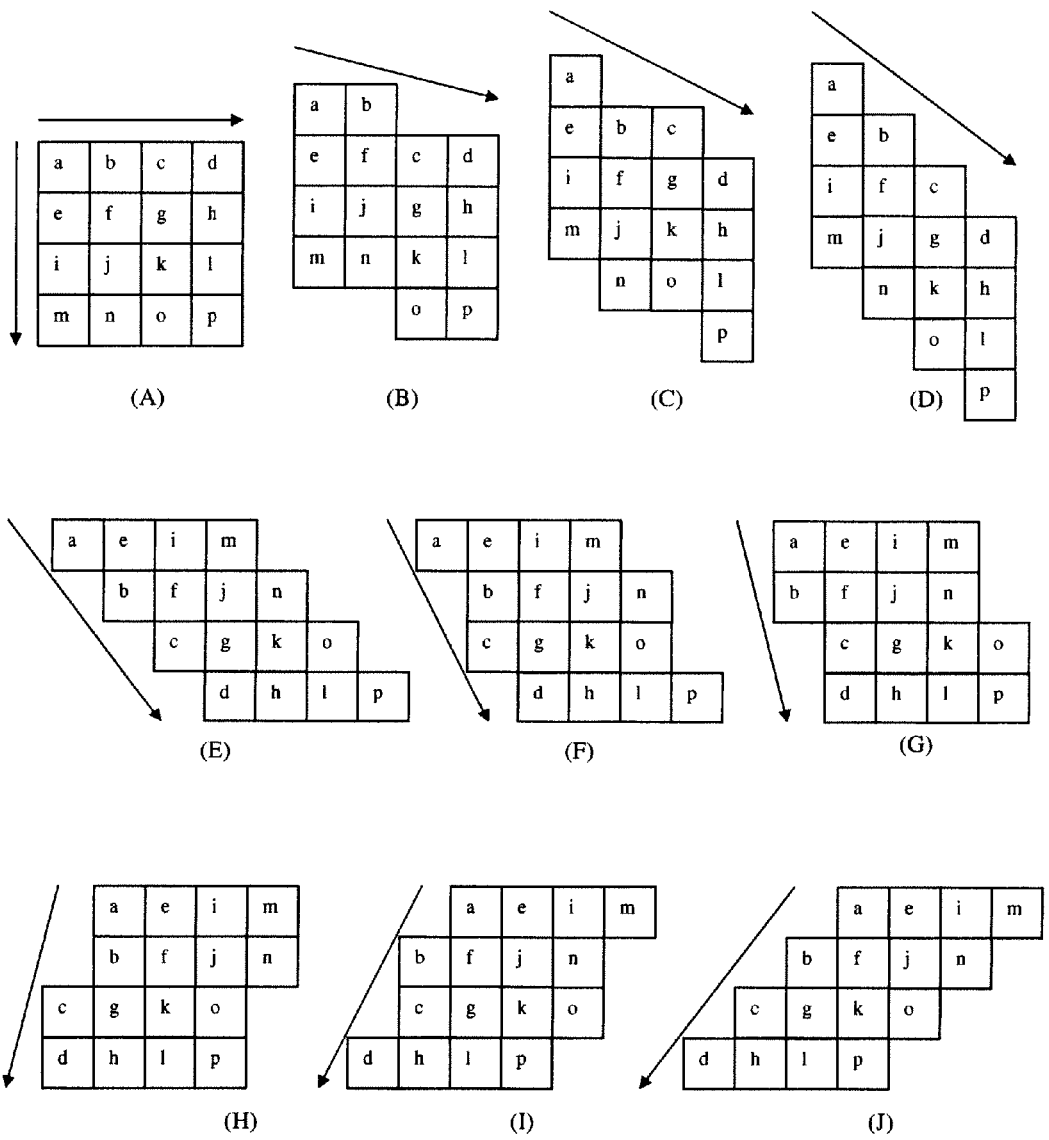
FIGS. 3A-M illustrate examples of masks that correspond to a library of sub-frame types.
Figure 3:
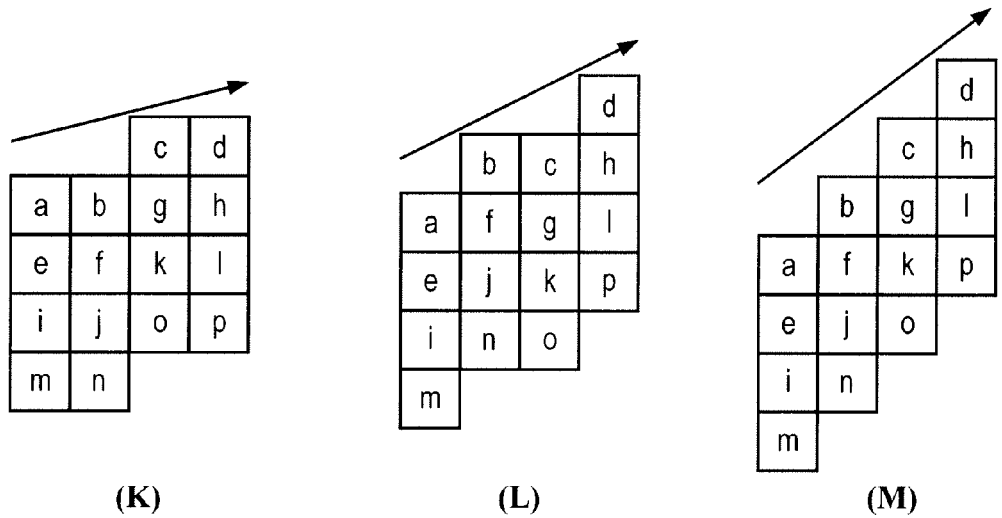

In one embodiment, M is equal to 4 and the library of sub-frame types correspond to a set of masks illustrated in FIGS. 3A-3M. Referring to FIGS. 3A-3M, with this library of sub-frames, the masks correspond to different directions as shown with arrows. The mask in FIG. 3A is referred to herein as a regular mask because it corresponds to the regular horizontal or vertical directions. The other masks are called directional masks since they correspond to non-trivial directions. The differential-position ($\Omega$) of a pixel ('a' to 'p') in a mask is defined as $\Omega=C_C+W \times C_R$, where W is the width of frame y. $C_C$ is the number of columns one needs to move horizontally to the right starting from the column of pixel 'a' to get to the column of the current pixel of interest. $C_R$ is the number of rows one needs to move vertically down starting from the row of pixel 'a' to get to the row of the current pixel of interest. For example, in the case of the mask in FIG. 3H, pixel 'c' has $C_C=-1$ and $C_R=2$. The sub-frame type corresponding to a mask is the vector containing the differential-positions of pixels in that mask ordered from 'a' to 'p'.

In one embodiment, the choice of the sub-frame type for a pixel is made by choosing the sub-frame type corresponding to the regular mask always. In another embodiment, the choice of the sub-frame type for a pixel is made, for each selected pixel, (1) by evaluating, for each sub-frame type, a 2-D DCT over the sub-frame formed, and (2) by choosing, for a given threshold T, the sub-frame type that minimizes the number of non-zero transform coefficients with magnitude greater than T. In yet another embodiment, the choice of the sub-frame type for a pixel is made by choosing, for each selected pixel, the sub-frame type that minimizes the warped row variance of pixel values averaged over all warped rows. In still another embodiment, the choice of the sub-frame type for a pixel is made by having, for a block of K×L pixels, each pixel vote for a sub-frame type (based on the sub-frame type that minimizes the warped row variance of pixel values averaged over all warped rows) and choosing the sub-frame type with the most votes for all the pixels in the K×L block, where K and L can be any integers greater than 0. In one embodiment, K and L are all set to be 4. In still another embodiment, the choice of the sub-frame type for a pixel is made by forming, for each pixel, a block of K×L pixels and choosing a sub-frame type by using the preceding voting scheme on this block. In each case, the chosen sub-frame type is used for the current pixel. Thus, by using one of these measured statistics for each mask, the selection of a subframe is performed.

Note that masks other than those in FIGS. 3A-3M may be used.

Figure 5:
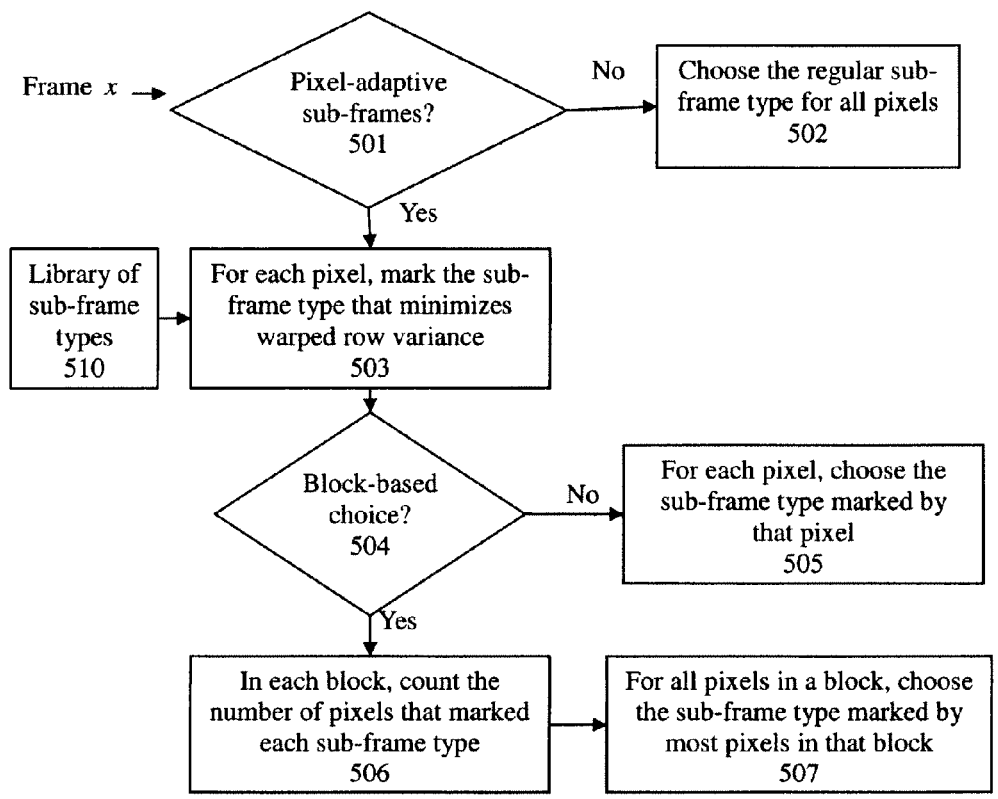
FIG. 5 is a flow diagram of one embodiment of a sub-frame type selection process.

FIG. 5 is a flow diagram of one embodiment of sub-frame selection processing. The process is performed by processing logic that may comprise hardware (circuitry, dedicated logic, etc.), software (such as is run on a general purpose computer system or a dedicated machine), or a combination of both.

Referring to FIG. 5, the process begins by processing logic receiving frame x and determining whether the sub-frames are pixel-adaptive (processing block 501). If the sub-frames are not pixel-adaptive, processing logic chooses the regular sub-frame type for all pixels (processing block 502). If the sub-frames of frame x are pixel adaptive, processing logic, for each pixel, marks the sub-frame type that minimizes the warped row variance (processing block 503). This is done using the library of sub-frame types (510) as described above. Thus, for each pixel, the sub-frame type that minimizes the warped row variance among the library of sub-frame types is marked.

Next, processing logic determines whether the choice is block-based (processing block 504). If processing logic determines the choice is block-based, processing logic counts the number of pixels that marked each sub-frame type in each block (processing block 506) and, for all pixels in a block, processing logic chooses the sub-frame type marked by most pixels in that block (processing block 507). In other words, if the choice is block-based, the sub-frame type marked by most pixels in a block is chosen for all pixels in that block. If processing logic determines the choice is not block-based, processing logic chooses, for each pixel, the sub-frame type marked by that pixel (processing block 505). In other words, each pixel chooses the sub-frame type marked by itself.

The choice of the sub-frame types for each pixel can be signaled within the vector OP.

The sub-frame type $s_i$ is used to form a vector $\bar{p}_i = s_i + m_i \times \bar{1}$, where $m_i$ is an integer and $\bar{1}$ is an $M^2 \times 1$ vector with all elements equal to 1. Processing logic also forms an $M^2 \times 1$ vector denoted by $\bar{z}_i$ (also a sub-frame) with the pixel values of the past output frame, $\bar{y}$, at locations corresponding to elements of $\bar{p}_i$ (processing block 203).

The choice of $m_i$ can be made in a number of different ways. In alternative embodiments, the choice of $m_i$ is performed in one of the following ways:

i. $m_i = i$
ii. choose $m_i$ from all possible values such that a p-norm (p≥0) between $z_i$ and $\bar{z}_i$, $\|z_i - \bar{z}_i\|_p$, is minimized.
iii. choose $m_i$ based on 'ii' above, but restrict the search set to $\{j: j = i + j_h + W \times j_v\}$, where W is the width of frame $\bar{y}$ and $j_h$, $j_v \in \{-J, -(J-1), \ldots, -1, 0, 1, \ldots, J-1, J\}$. J is any integer greater than or equal to zero. In one embodiment, when option 'iii' is used, the value of J is set to 2 and a 2-norm is used.
iv. calculate $m_i$ based on 'iii' above and add a value $k = k_h + W \times k_v$ to $m_i$, where W is the width of frame $\bar{y}$ and $k_h$, $k_v$ are randomly generated values from the set $\{-K, -(K-1), \ldots, -1, 0, 1, \ldots, K-1, K\}$. K is any integer greater than or equal to zero.

The choice of $m_i$ can be signaled within the vector OP.

In another embodiment, the sub-frame $\bar{z}_i$ is formed after the past output frame $\bar{y}$ has been processed using techniques such as, but not limited to, Intensity Compensation and Non-linear Prediction Filter, to compensate for issues such as, for example, brightness changes and scene fades.

Figure 6:
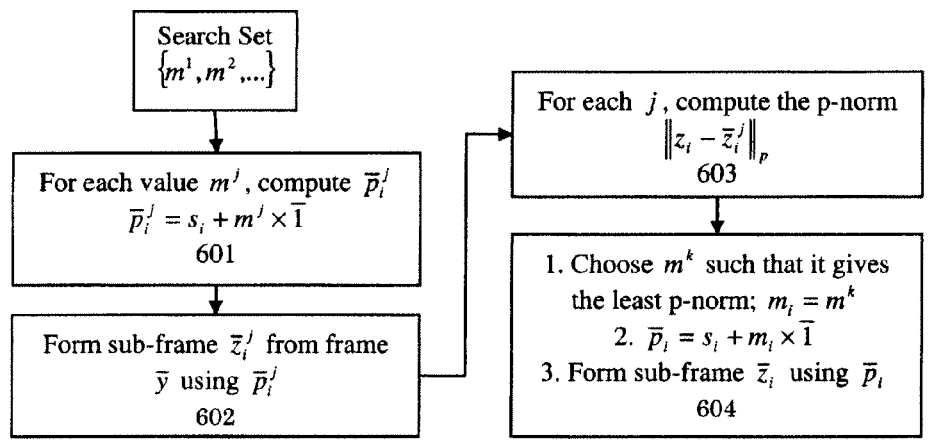
FIG. 6 is a flow diagram of one embodiment of a sub-frame formation process from the past output frame.

FIG. 6 is a flow diagram of one embodiment of a sub-frame formation process from the past output frame. The process is performed by processing logic that may comprise hardware (circuitry, dedicated logic, etc.), software (such as is run on a general purpose computer system or a dedicated machine), or a combination of both.

Referring to FIG. 6, the process begins by processing logic using a search set $\{m^1, m^2, \ldots\}$ and, for each value $m^j$, computes $\bar{p}_i^j$ according to the following formula:

$$\bar{p}_i^j = s_i + m^j \times \bar{1}$$

(processing block 601).

Next, processing logic forms sub-frame $\bar{z}_i^j$ from frame $\bar{y}$ using $\bar{p}_i^j$ (processing block 602). Then, for each j, processing logic computes the p-norm $$\|z_i - \bar{z}_i^j\|_p$$

(processing block 603).

After computing the p-norm, processing logic selects $m^k$ such that it gives the least p-norm; sets $m_i$ equal to $m^k$, sets $\bar{p}_i$ according to the following formula:

$$\bar{p}_i = s_i + m_i \times \bar{1}$$

and forms sub-frame $\bar{z}_i$ using $\bar{p}_i$ (processing block 604).

Spatial Transform Selection and Application

As part of processing block 204 of FIG. 2, processing logic also performs spatial transform selection and application. More specifically, processing logic transforms the sub-frames $z_i$ and $\bar{z}_i$ into $e_i$ and $\bar{e}_i$ respectively using a pixel-adaptive warped spatial transform $H_i$. The transform is called 'warped' because the support of the transform basis has warped to match the sub-frame shape. The transform is called pixel-adaptive because sub-frames pivoted at different pixels can use different transforms in addition to the fact that the choice of sub-frame type can vary from pixel to pixel. The transform $H_i$ can be chosen from a library of transforms such as separable DCT, non-separable DCT, 2-D Gabor wavelets, Steerable pyramids, 2-D directional wavelets, Curvelets and Contourlets. In one embodiment, the spatial transform used is an orthonormal separable 2D-DCT in a non-adaptive fashion. In another embodiment, the spatial transform used is an orthonormal separable 2D-Hadamard transform in a non-adaptive fashion.

It should be noted that a separable transform becomes non-separable after it is warped. The choice of the transform can be fixed apriori or can be adaptive to the different sub-frames pivoted at different pixels. In the adaptive case, the chosen transform is the one that has the least number of coefficients in $e_i$ with absolute value greater than a master threshold $T_{S1}$.

Figure 7:
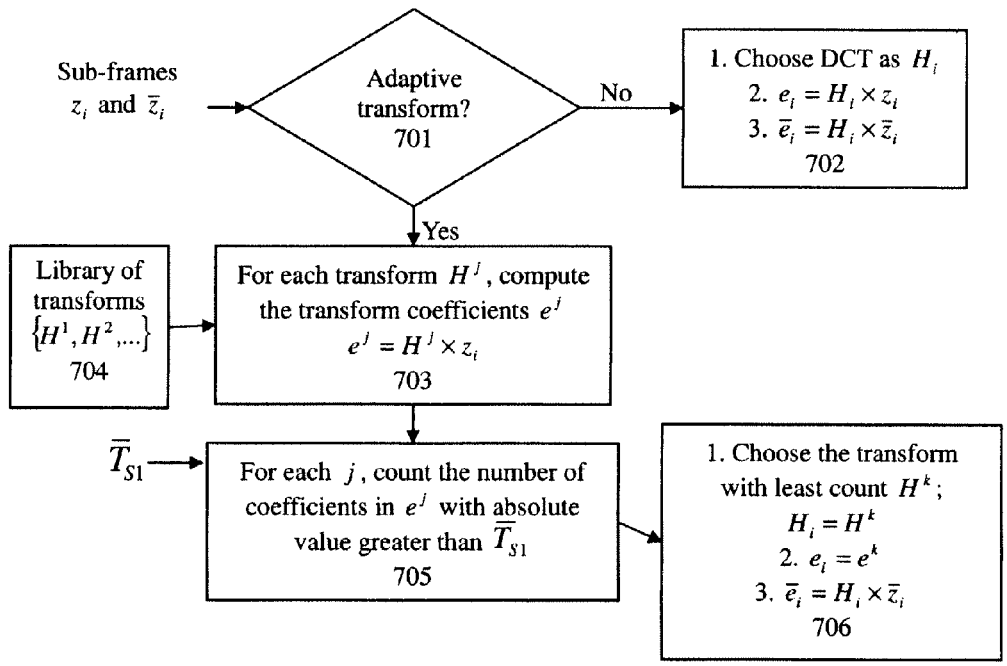
FIG. 7 is a flow diagram of one embodiment of a spatial transform selection process.

A flow diagram of one embodiment of a spatial transform selection process for a sub-frame is illustrated in FIG. 7. The process is performed by processing logic that may comprise hardware (circuitry, dedicated logic, etc.), software (such as is run on a general purpose computer system or a dedicated machine), or a combination of both.

Referring to FIG. 7, the process begins by processing logic testing whether the transform is pixel-adaptive (processing block 701). This test may be performed by referring to a list. In one embodiment, the list can be such that the transform is non-adaptive. In another embodiment, the list can be signaled within the vector OP. If processing logic determines that the transform is not pixel-adaptive, processing logic selects a 2-D orthonormal separable DCT for use as the transform $H_i$, generates the transform coefficients $e_i$ by applying the transform to the sub-frame $z_i$, and generates the transform coefficients $\bar{e}_i$ by applying the transform to the sub-frame $\bar{z}_i$ (processing block 702).

If processing logic determines the transform is pixel-adaptive, then, for each transform $H^j$ in the library of transforms $\{H^1, H^2, \ldots\}$ (processing block 704), processing logic computes the transform coefficients $e^j$ using the formula:

$$e^j = H^j \times z_i$$

(processing block 703).

The transform coefficients $e^j$ correspond to the transform $H^j$.

Next, for each j, processing logic counts the number of coefficients in $e^j$ with an absolute value greater than a threshold $T_{S1}$ (processing block 705) and chooses the transform from the library of transforms with the least count $H^k$, sets the transform $H_i$ equal to the transform corresponding to the least count ($H^k$), then sets the coefficients $e_i$ equal to the transform coefficients $e^k$ and generates the transform coefficients $\bar{e}_i$ by applying the transform $H_i$ to the sub-frame $\bar{z}_i$ (processing block 706).

The choice of the spatial transform can be signaled within the vector OP.

Thresholding

As part of processing block 204 of FIG. 2, processing logic also performs thresholding. More specifically, processing logic applies an adaptive threshold $\hat{T}_{i1}$ on selected elements of $e_i$ to get $a_i$. In one embodiment, all the elements of $e_i$ are selected. In another embodiment, all elements except the first element (usually the DC element) are selected. In still another embodiment, none of the elements are selected. The transform coefficients $e_i$ are also thresholded using a master threshold $T_{S1}$ to get $\hat{e}_i$. The thresholding operation can be done in a variety of ways such as, for example, hard thresholding and soft thresholding. The hard thresholding operation is defined as $$HT(x) = \begin{cases} x, & |x| \geq T \\ 0, & |x| < T \end{cases},$$

where T is the threshold used. Similarly, the soft thresholding operation with T as the threshold is defined as $$ST(x) = \begin{cases} x-T, & x \geq T \\ x+T, & x \leq -T \\ 0, & |x| < T \end{cases}.$$

In alternative embodiments, the threshold $\hat{T}_{i1}$ is computed in one of the following ways:

$\hat{T}_{i1} = 0$
$\hat{T}_{i1} = T_{S1}$ $$\hat{T}_{i1} = f\left(T_{S1}, \sum_{j=1}^{N} \|e_j - \hat{e}_j\|^2\right),$$

where $f(\ )$ represents a function.

$\hat{T}_{i1} = f(T_{S1}, \|e_i - \hat{e}_i\|^2)$, where $f(\ )$ represents a function.

Figure 11:
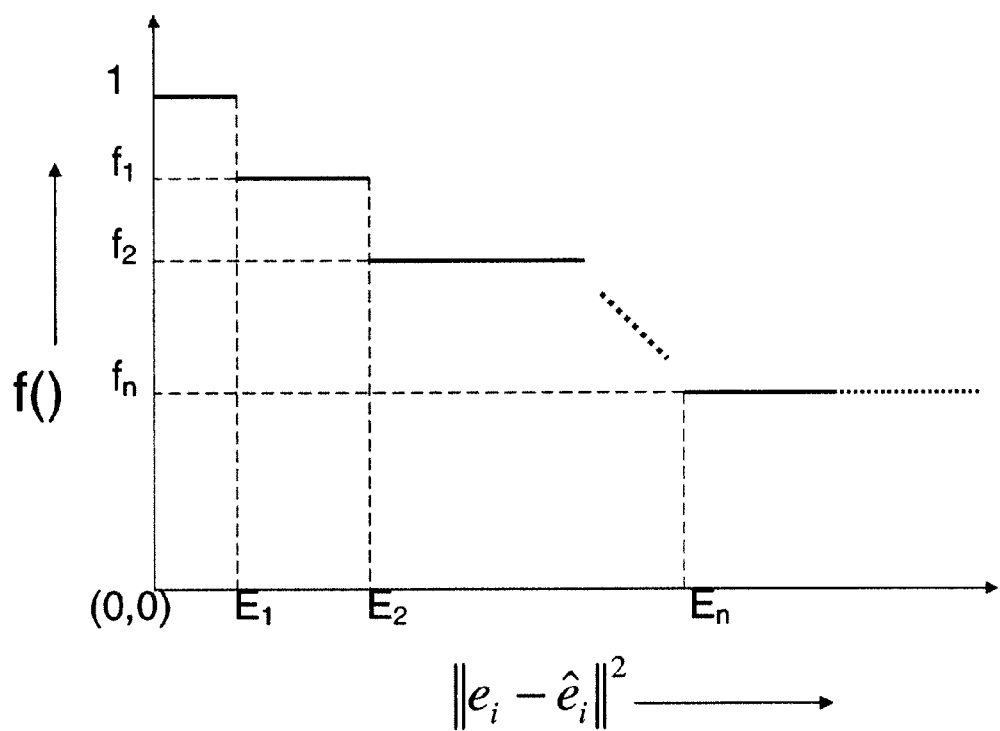
FIG. 11 illustrates a monotonic decreasing stair-case function.

$\hat{T}_{i1} = T_{S1} \times f(\|e_i - \hat{e}_i\|^2)$. The function $f(\ )$ is a monotonic decreasing stair-case function as illustrated in FIG. 11. In one embodiment, the step positions of the function $(f_1, f_2, \ldots, f_n$ and $E_1, E_2, \ldots, E_n)$ are tuned on a training set to achieve a local optimum in reconstructed image/video quality. In one embodiment, this threshold computation is used with hard thresholding.

Perform a search on possible values for $\hat{T}_{i1}$ to minimize the number of non-zero elements in $a_i$ such that $\|e_i - a_i\|^2 < E_{local}$. $E_{local}$ can be part of the side-information or default values may be used. This can be viewed as a setting for the algorithm. In one embodiment, a default value can be obtained by tuning on a training set and choosing the value that achieves a local optimum in reconstructed image/video quality.

Perform a joint search on possible values for $(\hat{T}_{11}, \hat{T}_{21}, \ldots, \hat{T}_{N1})$ to minimize the total number of non-zero elements in $a_k$ summed over all $k \in \{1, 2, \ldots, N\}$ such that $$\sum_{j=1}^{N} \|e_j - a_j\|^2 < E_{global} \cdot E_{global}$$

can be part of the side-information or default values may be used. This can be viewed as a setting for the algorithm. In one embodiment, a default value can be obtained by tuning on a training set and choosing the value that achieves a local optimum in reconstructed image/video quality.

The value of $\hat{T}_{i1}$ can be signaled within the vector OP. In another embodiment, the choice of the option used for calculating $\hat{T}_{i1}$ can be signaled within the vector OP.

An adaptive threshold $\hat{T}_{i2}$ is applied on selected elements of $\bar{e}_i$ to get $\bar{a}_i$. In one embodiment, all the elements of $\bar{e}_i$ are selected. In another embodiment, all elements except the first element (usually the DC element) are selected. In still another embodiment, none of the elements are selected. The transform coefficients $\bar{e}_i$ are also thresholded using a master threshold $T_{S2}$ to get $\tilde{e}_i$. The thresholding operation can be done in a variety of ways such as hard thresholding and soft thresholding described above.

In alternative embodiments, the threshold $\hat{T}_{i2}$ is computed in one of the following ways:

$\hat{T}_{i2}=0$
$\hat{T}_{i2}=T_{S2}$ $$\hat{T}_{i2} = f\left(\overline{T}_{S2}, \sum_{j=1}^{N} \|\bar{e}_j - \tilde{e}_j\|^2\right),$$

where $f(\ )$ represents a function.

$\hat{T}_{i2}=f(T_{S2}, \|\bar{e}_i-\tilde{e}_i\|^2)$, where $f(\ )$ represents a function.
$\hat{T}_{i2}=T_{S2}\times f(\|\bar{e}_i-\tilde{e}_i\|^2)$. The function $f(\ )$ is a monotonic decreasing stair-case function as illustrated in FIG. 11. The step positions of the function ($f_1, f_2, \ldots, f_n$ and $E_1, E_2, \ldots, E_n$) are tuned on a training set to achieve a local optimum. In one embodiment, this threshold computation is used and hard thresholding is used for the thresholding operation.

Perform a search on possible values for $\hat{T}_{i2}$ to minimize the number of non-zero elements in $\bar{a}_i$ such that $\|\bar{e}_i-\bar{a}_i\|^2<E_{local}$. $E_{local}$ can be part of the side-information or default values may be used. This can be viewed as a setting for the algorithm. In one embodiment, a default value can be obtained by tuning on a training set and choosing the value that achieves a local optimum in reconstructed image/video quality.

Perform a joint search on possible values for ($\hat{T}_{12}, \hat{T}_{22}, \ldots, \hat{T}_{N2}$) to minimize the total number of non-zero elements in $\bar{a}_k$ summed over all $k \in \{1, 2, \ldots, N\}$ such that $$\sum_{j=1}^{N} \|\bar{e}_j - \bar{a}_j\|^2 < E_{global} \cdot E_{global}$$

can be part of the side-information or default values may be used. This can be viewed as a setting for the algorithm. In one embodiment, a default value can be obtained by tuning on a training set and choosing the value that achieves a local optimum in reconstructed image/video quality.

In one embodiment, the value of $\hat{T}_{i2}$ is signaled within the vector OP. In another embodiment, the choice of the option used for calculating $\hat{T}_{i2}$ is signaled within the vector OP.

Temporal Transform Selection and Application

Processing logic in processing blocks 205 uses the results of the thresholding, namely vectors $a_i$ and $\bar{a}_i$, to form an $M^2 \times 2$ matrix $\tilde{a}_i$; $\tilde{a}_i=[a_i \ h(\bar{a}_i)]$. For purposes herein, the function $h(\ )$ may be an identity function or a simple linear scaling of all the elements of $\bar{a}_i$ to match brightness changes or a more general function to capture more complex scene characteristics such as fades. Processing logic transforms $\tilde{a}_i$ into $b_i$ using a pixel-adaptive temporal transform $G_i$; $b_i=\tilde{a}_i \times G_i$. The transform $G_i$ can be chosen from a library of transforms. The transform is called pixel-adaptive because sub-frames pivoted at different pixels can use different transforms. In the adaptive case, the chosen transform is the one that has the least number of coefficients in $b_i$ with absolute value greater than a master threshold $\overline{T}$.

Figure 8:
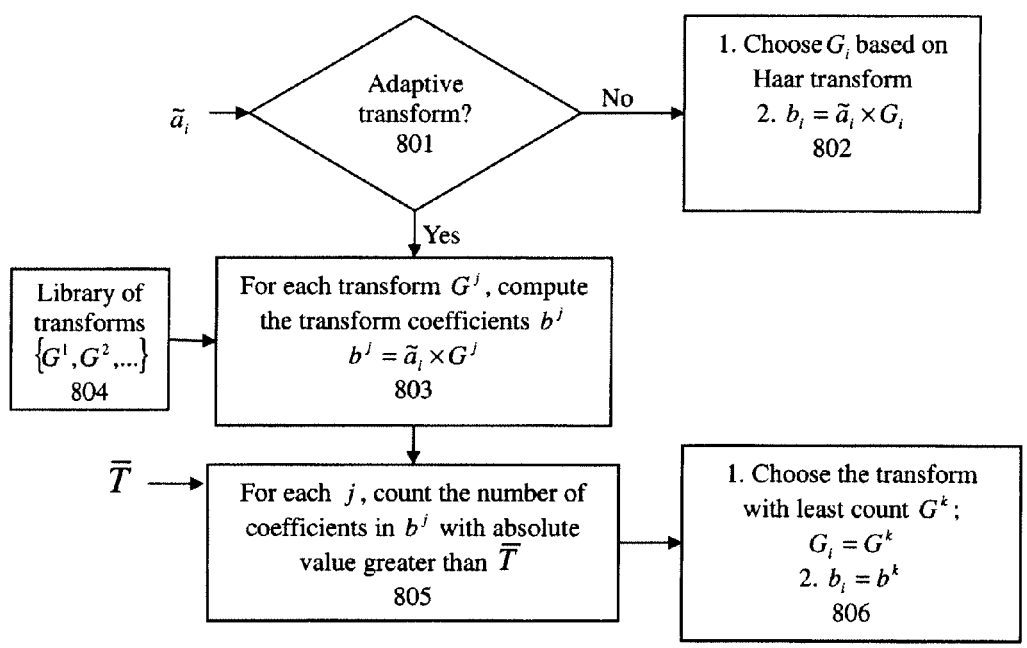
FIG. 8 is a flow diagram of one embodiment of a temporal transform selection process.

FIG. 8 is a flow diagram of one embodiment of a temporal transform selection process. The process is performed by processing logic that may comprise hardware (circuitry, dedicated logic, etc.), software (such as is run on a general purpose computer system or a dedicated machine), or a combination of both.

Referring to FIG. 8, the process begins by processing logic testing whether the transform is pixel-adaptive (processing block 801). This test may be performed by referring to a list. In one embodiment, the list can be such that the transform is non-adaptive. In another embodiment, the list can be signaled within the vector OP. If processing logic determines that the transform is not pixel-adaptive, processing logic selects transform $G_i$ based on a default temporal transform and generates the transform coefficients $b_i$ by applying the transform $G_i$ to the matrix $\tilde{a}_i$ (processing block 802). In one embodiment, the default temporal transform used is a Haar transform, i.e.

$$G_i = \begin{bmatrix} \frac{1}{\sqrt{2}} & \frac{1}{\sqrt{2}} \\ \frac{1}{\sqrt{2}} & -\frac{1}{\sqrt{2}} \end{bmatrix}.$$

The choice of the temporal transform can be signaled within the vector OP.

If processing logic determines the transform is pixel-adaptive, then, for each transform $G^j$ in the library of transforms $\{G^1, G^2, \ldots\}$ (processing block 804), processing logic computes the transform coefficients $b^j$ using the formula:

$$b^j = \tilde{a}_i \times G^j$$

(processing block 803).

The transform coefficients $b^j$ correspond to the transform $G^j$.

Next, for each j, processing logic counts the number of coefficients in $b^j$ with an absolute value greater than a master threshold $\overline{T}$ (processing block 805) and then chooses the transform from the library of transforms with the least count $G^k$, sets the transform $G_i$ equal to the transform corresponding to the least count ($G^k$), and then sets the coefficients $b_i$ equal to the transform coefficients $b^k$ (processing block 806).

Thresholding after Temporal Transform

After generating the transform coefficients $b_i$, the transform coefficients $b_i$ are thresholded using $\overline{T}$ to get $c_i$ (processing block 206 of FIG. 2). The thresholding operation can be done in a variety of ways such as hard thresholding and soft thresholding as described above. The choice of thresholding can be signaled within the vector OP.

Figure 9:
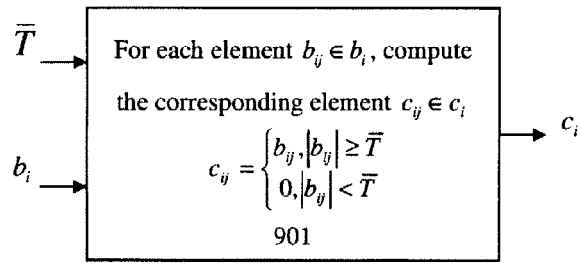
FIG. 9 is a flow diagram of one embodiment of a thresholding process for thresholding transform coefficients.

In one embodiment, hard thresholding is used as illustrated in FIG. 9. Referring to FIG. 9, the hard thresholding is performed by processing logic that may comprise hardware (circuitry, dedicated logic, etc.), software (such as is run on a general purpose computer system or a dedicated machine), or a combination of both.

The hard thresholding begins using a master threshold $\overline{T}$ and coefficients $b_i$ as inputs, and processing logic, for each element $b_{ij} \in b_i$, computing the corresponding element $c_{ij} \in c_i$ according to the following equation:

$$c_{ij} = \begin{cases} b_{ij}, & |b_{ij}| \geq \overline{T} \\ 0, & |b_{ij}| < \overline{T} \end{cases}$$

(processing block 901). In this manner, processing logic sets to zero all coefficients with absolute values less than the master threshold T and these coefficients are stored as $c_i$.

In one embodiment, some elements of $b_i$, selected apriori, are not thresholded and copied directly into their respective positions in $c_i$. In a specific embodiment, the elements in the first column of $b_i$ are not thresholded. The choice of the set of elements that are not thresholded can be signaled within the vector OP.

In one embodiment, the elements $c_{ij} \in c_i$ are optionally enhanced by using the equation $c_{ij} = c_{ij} * \alpha_{j0} + \alpha_{j1}$, where the parameters $\alpha_{j0}$, $\alpha_{j1}$ are tuned on a training set to achieve a local optimum in reconstructed image/video quality. Note that such an operation occurs after processing block 206 in FIG. 2. In one embodiment, the parameters can be signaled within the vector OP.

Inverse Transformation

After thresholding, processing logic inverse transforms (with a temporal transform) the coefficients using $G_i^{-1}$ to obtain $\tilde{d}_i = [d_i \; \bar{d}_i] = c_i \times G_i^{-1}$ (processing block 207). Processing logic also applies an inverse transform (spatial) $H_i^{-1}$ on $d_i$ to obtain the processed sub-frame $\hat{z}_i$ (processing block 208).

In one embodiment, the current frame is processed without using the past frame output by a previous iteration. In this embodiment, the vectors $\bar{z}_i, \bar{e}_i, \bar{a}_i$ and the matrices $\tilde{a}_i, b_i, c_i, \tilde{d}_i$ are not computed. The vector $d_i$ is obtained as $d_i = a_i$ and the inverse transform (spatial) $H_i^{-1}$ is applied on $d_i$ to obtain the processed sub-frame $\hat{z}_i$ ($\hat{z}_i = H_i^{-1} \times d_i$).

In another embodiment, a set of past frames $\{\bar{y}, \bar{\bar{y}}, \dots\}$ output as a result of the image processing can be used instead of just using the immediate past output frame $\bar{y}$. Let $N_{PF}$ denote the number of past frames in the set. In this case, each of the past frames in the set contributes to one column of $\tilde{a}_i$ in the same way, as described above. The output frame $\bar{y}$ contributes in the form of $\bar{a}_i$ to the second column, the output frame $\bar{\bar{y}}$ contributes in the form of $\bar{\bar{a}}_i$ to the third column and so on. In one embodiment, $\tilde{a}_i, b_i, c_i$ and $d_i$ are of size $M^2 \times (N_{PF}+1)$ and $G_i$ is of size $(N_{PF}+1) \times (N_{PF}+1)$.

Combining Sub-Frames

After applying the inverse transform to the thresholded coefficients, all of the processed sub-frames are combined in a weighted fashion to form frame y. In one embodiment, a weight $w_i$ is computed for each processed sub-frame $\hat{z}_i$. In alternative embodiments, weights based on $e_i$ and $a_i$ are computed in one of the following ways:

$w_i = 1$ $w_i = f(e_i, a_i)$, where $f( )$ represents a function.

MSE option 1:

$$w_i = \begin{cases} \dfrac{1}{\|e_i - a_i\|^2}, & \|e_i - a_i\|^2 > e_{min} \\ \dfrac{1}{e_{min}}, & \|e_i - a_i\|^2 \le e_{min}, \end{cases}$$

where $e_{min}$ is a constant.

L-p Norm ($p \ge 0$) option 1:

$$w_i = \begin{cases} \dfrac{1}{\|a_i\|_p}, & \|a_i\|_p > n_{min} \\ \dfrac{1}{n_{min}}, & \|a_i\|_p \le n_{min}, \end{cases}$$

where $n_{min}$ is a constant.

Tuned weights option 1: $w_i = f_t(\|a_i\|_0)$, where $f_t( )$ represents a mapping from the set $\{1, 2, \dots, M^2\}$ (set of possible values for $\|a_i\|_0$) to $[0,1]$. $f_t( )$ is tuned using optimization algorithms such as simulated annealing to get the best performance (measured using metrics such as PSNR or using subjective scores) on a set of training videos.

In other embodiments, weights for weighting based on $b_i$ and $c_i$ can be computed in one of the following ways:

$w_i = f(b_i, c_i)$, where $f( )$ represents a function.

MSE option 2:

$$w_i = \begin{cases} \dfrac{1}{\|b_i - c_i\|^2}, & \|b_i - c_i\|^2 > e_{min} \\ \dfrac{1}{e_{min}}, & \|b_i - c_i\|^2 \le e_{min}, \end{cases}$$

where $e_{min}$ is a constant.

L-p Norm ($p \ge 0$) option 2:

$$w_i = \begin{cases} \dfrac{1}{\|c_i\|_p}, & \|c_i\|_p > n_{min} \\ \dfrac{1}{n_{min}}, & \|c_i\|_p \le n_{min}, \end{cases}$$

where $n_{min}$ is a constant.

Tuned weights option 2: $w_i = f_t(\|c_i\|_0)$, where $f_t( )$ represents a mapping from the set $\{1, 2, \dots, 2M^2\}$ (set of possible values for $\|c_i\|_0$) to $[0,1]$. $f_t( )$ is tuned using optimization algorithms such as simulated annealing to get the best performance (measured using metrics such as PSNR or using subjective scores) on a set of training videos.

The mapping $f_t( )$ and/or the calculated weight can be signaled within the vector OP.

The processed sub-frames $\hat{z}_{1:N}$ (corresponding to all pixels) are combined together to form y in a weighted manner. One embodiment of this process is described for $y_j$ which is the value of the $j^{th}$ pixel.

Figure 10:
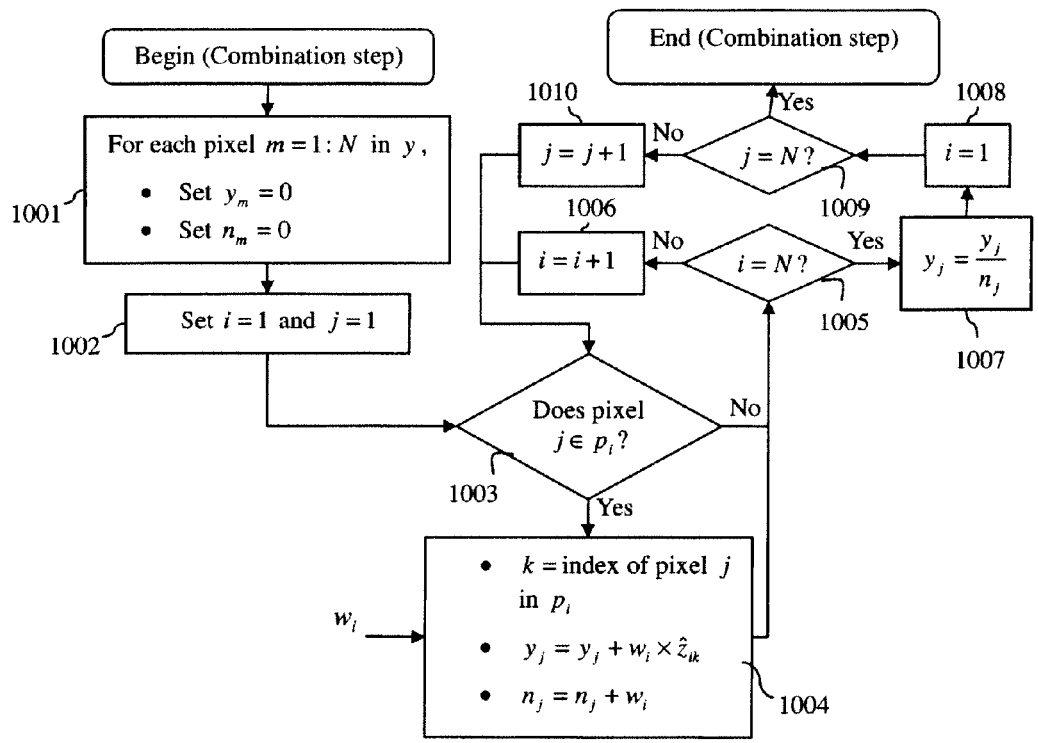
FIG. 10 is a flow diagram of one embodiment of a process for combining sub-frames to create a frame.

1. Set $y_j = 0$ and $n_j = 0$, where $n_j$ is the normalization coefficient for $j^{th}$ pixel.
2. For each processed sub-frame $\hat{z}_i$
    a. If pixel j is part of $p_i$
        i. k = index of pixel j in $p_i$.
        ii. $y_j = y_j + w_i \times \hat{z}_{ik}$, where $\hat{z}_{ik}$ is the value of pixel j in the processed sub-frame $\hat{z}_i$.
        iii. $n_j = n_j + w_i$ 3. $y_j = \dfrac{y_j}{n_j}$ FIG. 10 is a flow diagram of one embodiment of a process for combining all processed sub-frames to form frame y. The process is performed by processing logic that may comprise hardware (circuitry, dedicated logic, etc.), software (such as is run on a general purpose computer system or a dedicated machine), or a combination of both.

Referring to FIG. 10, the process begins by setting its value $y_m$ and its normalizing factor $n_m$ to zero for each pixel m=1:N in frame y (processing block 1001). Next, processing logic initializes the pixel index j and the sub-frame index i to one (processing block 1002).

After initialization, processing logic determines whether pixel $j \in p_i$ (processing block 1003). If it is, the process transitions to processing block 1004. If not, process transitions to processing block 1005.

At processing block 1004, in one embodiment, processing logic updates $y_j$ and $n_j$ using $\hat{z}_{ik}$, the value of the pixel j in $\hat{z}_i$, and using weight $w_i$ as described above. In one embodiment, the weight is calculated according to the following:

$$w_i = \begin{cases} \frac{1}{\|e_i - a_i\|^2}, & \|e_i - a_i\|^2 > e_{min} \\ \frac{1}{e_{min}}, & \|e_i - a_i\|^2 \le e_{min} \end{cases}$$

In processing block 1004, k is equal to the index of pixel j in $p_i$. In one embodiment, processing logic updates $y_j$ and $n_j$ based on the following equation:

$$y_j = y_j + w_i \times \hat{z}_{ik}$$

$$n_j = n_j + w_i$$

After processing logic updates $y_j$ and $n_j$, the process transitions to processing block 1005.

At processing block 1005, processing logic checks whether the index i=N, the total number of pixels in the frame. If so, the process transitions to processing block 1007. If not, the process transitions to processing block 1006. At processing block 1006, the index is incremented by one and the process transitions to processing block 1003.

At processing block 1007, processing logic updates $y_j$ according to the following equation:

$$y_j = \frac{y_j}{n_j}.$$

After updating $y_j$, processing logic sets the index i equal to 1 (processing block 1008) and checks whether the index j is equal to N (processing block 1009). If it is, the process ends. If not, the process transitions to processing block 1010 where the index j is incremented by one. After incrementing the index j by one, the process transitions to processing block 1003.

The frame y is the output corresponding to the current input frame x. If there are more frames to process, processing logic updates the current input frame x, copies y into $\bar{y}$ and repeat the process as shown in FIG. 2 (processing block 212).

In one embodiment, the frame y undergoes further image/video processing in pixel-domain or a transform domain. In one embodiment, unsharp masking is performed on frame y to enhance high-frequency detail. In another embodiment, multiple blocks of size P×P pixels are formed from frame y, where P is an integer and each P×P block f undergoes a block transform, such as 2-D DCT, 2-D Hadamard etc, to produce another P×P block h. The elements of P×P block h, h(i,j), 0≤i, j≤P−1, are processed to form an enhanced P×P block $\tilde{h}$ such that $\tilde{h}(i,j)=h(i,j)*\alpha(i,j)$. In alternative embodiments, the enhancement factor $\alpha(i,j)$ can be computed in one of the following ways:

a. $\alpha(i,j) = \alpha_0 * (i+j)^\beta + \alpha_1$ b. $\alpha(i,j) = \alpha_0 * i^\beta * j^\delta + \alpha_1$ where the parameters ($\alpha_0$, $\alpha_1$, $\beta$ and $\delta$) are tuned on a training set to achieve a local optimum in reconstructed image/video quality. In one embodiment, the parameters can be signaled within the vector OP. Note that the above operations occur after processing block 210 of FIG. 2. The enhanced P×P blocks are inverse transformed and combined to form an enhanced version of frame y.

An Alternative Image Processing Embodiment

In an alternative embodiment, the process described in FIG. 2 can be modified to get a lower complexity algorithm, hereinafter referred to as the lower-complexity technique. The lower-complexity technique is illustrated by the flow chart in FIG. 12. In this embodiment, the frame y is the output of the lower-complexity technique corresponding to the current input frame x, and if there are more frames to process, we update the current input frame x, copy y into $\bar{y}$ and repeat the process as shown in FIG. 12.

Figure 12:
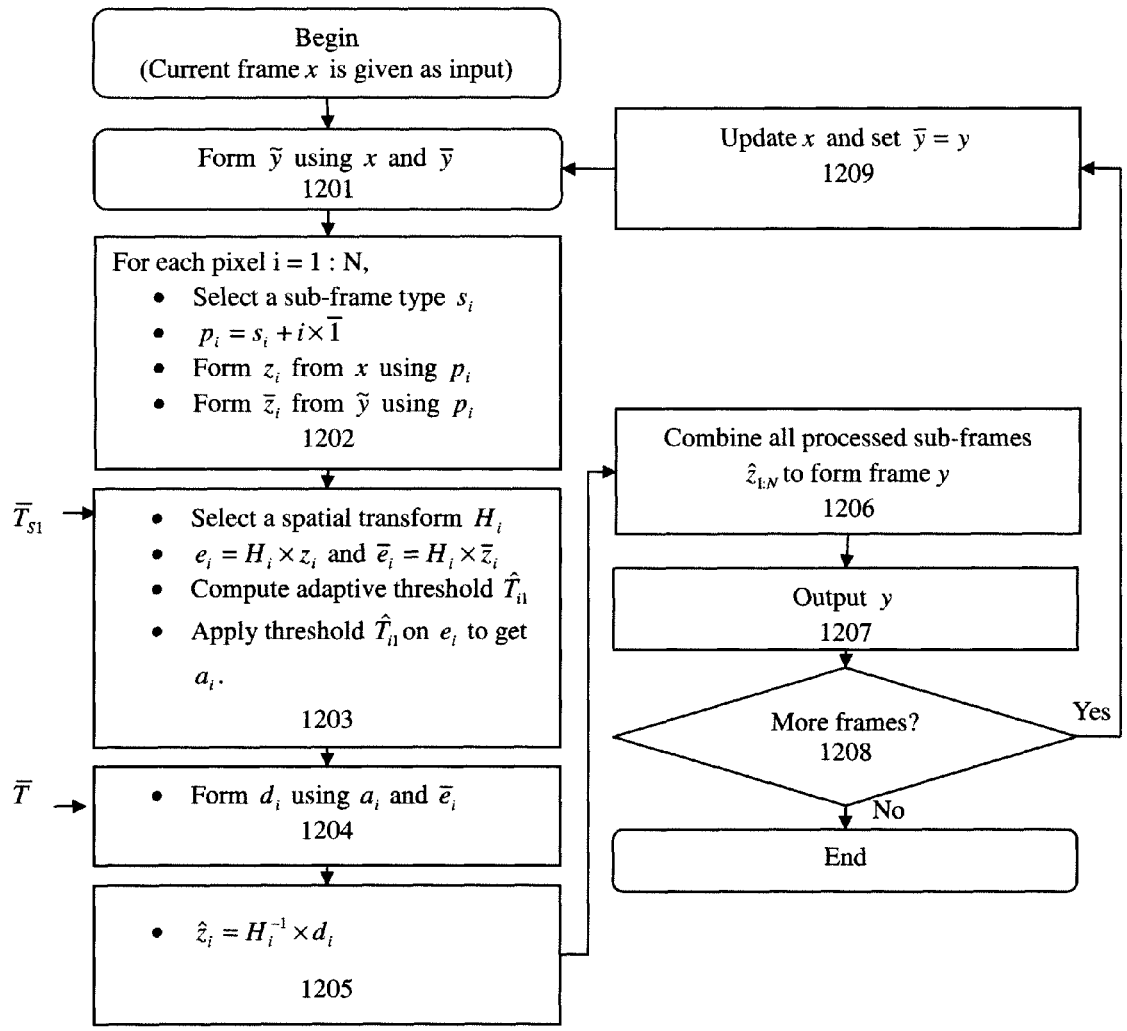
FIG. 12 is a flow diagram of another embodiment of a process for performing image processing on a video sequence.
Figure 13:
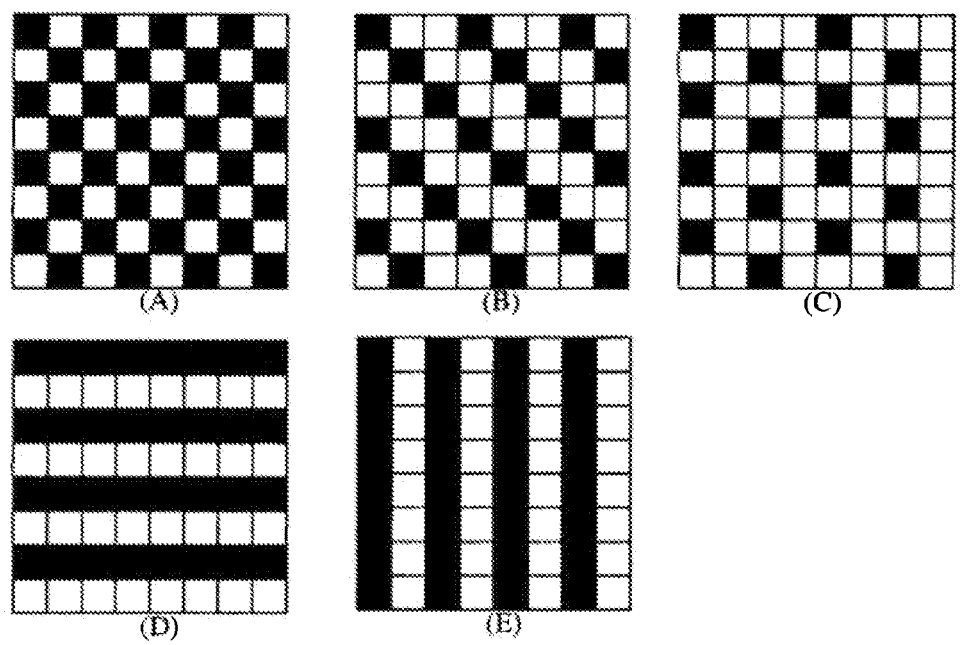
FIGS. 13A-E illustrate example subsets of selected pixels.

Referring to FIG. 12, the process begins by processing logic forming a frame $\tilde{y}$ using the current input frame x and the past output frame $\bar{y}$ such that $$\tilde{y}(j) = w_x * x(j) - w_y * \bar{y}(j+m) \; j \in Z, 1 \le j \le H*W,$$

where $w_x$, $w_y$ are real numbers and m is an integer (processing block 1201). For purposes herein, the notation (j) denotes the value of pixel j (numbered in the raster scan order) in the frame of interest. For example, $\bar{y}(5)$ represents the value of $5^{th}$ pixel of frame $\bar{y}$. In one embodiment, $w_x=0.5$ and $w_y=0.5$. In one embodiment, the values $w_x$ and $w_y$ are signaled within the vector OP.

In alternative embodiments, the choice of m can be made in one of the following ways:

i. m=0 ii. choose m from all possible values such that the p-norm (p≥0) of $\tilde{y}$, $\|\tilde{y}\|_p$, is minimized.

iii. choose m based on 'ii' above, but restrict the search set to $\{j: j=j_h+W \times j_v\}$, where W is the width of frame x and $j_h$, $j_v \in \{-J, -(J-1), \ldots, -1, 0, 1, \ldots, J-1, J\}$ J is any integer greater than or equal to zero.

In one embodiment, the choice of m can be signaled within the vector OP.

In another embodiment, the frame $\tilde{y}$ is formed using a processed version of $\bar{y}$ instead of $\bar{y}$ to compensate for issues such as brightness changes and scene fades, where the processing includes techniques such as, but not limited to, Intensity Compensation and Non-Linear Prediction Filter.

Processing logic forms an $M^2 \times 1$ vector $z_i$ called a sub-frame with pixel values of frame x at locations corresponding to elements of $p_i$. Pixel i is called the pivot for sub-frame $z_i$ (processing block 1202). An $M^2 \times 1$ vector denoted by $\bar{z}_i$ (also a sub-frame) is formed with the pixel values of frame $\tilde{y}$ at locations corresponding to elements of $p_i$ (processing block 1202).

Processing logic selects a spatial transform $H_i$ and applies the spatial transform to sub-frames $z_i$ and $\bar{z}_i$ to get vectors $e_i$ and $\bar{e}_i$ respectively (processing block 1203).

Processing logic computes adaptive threshold $\hat{T}_{i1}$ from $T_{S1}$ using the same process described above and applies the adaptive threshold $\hat{T}_{i1}$ on selected elements of $e_i$ to get $a_i$ (processing block 1203). In one embodiment, all the elements of $e_i$ are selected. In another embodiment, all elements except the first element (usually the DC element) are selected. The thresholding operation can be done in a variety of ways such as hard thresholding and soft thresholding, as described above.

After applying the adaptive threshold $\hat{T}_{i1}$ on selected elements of $e_i$, processing logic forms a vector $d_i$ using $a_i$, $\bar{e}_i$ and using threshold $\bar{T}$ (processing block 1204). Let $a_{ij}$, $e_{ij}$, $\bar{e}_{ij}$ and $d_{ij}$ represent the $j^{th}$ element in the vectors $a_i$, $e_i$, $\bar{e}_i$ and $d_i$ respectively, where $j \in \{1, 2, \ldots, M^2\}$. In alternative embodiments, the value $d_{ij}$ is computed in one of the following ways:

i. $d_{ij} = \begin{cases} \dfrac{w_y^2 * e_{ij} + w_z * (w_z * e_{ij} - \overline{e}_{ij})}{(w_x + w_y)w_y} & a_{ij} \neq 0, |\overline{e}_{ij}| < T \\ e_{ij} & a_{ij} \neq 0, |\overline{e}_{ij}| \geq \overline{T} \\ 0 & a_{ij} = 0 \end{cases}$ ii. $d_{ij} = \begin{cases} \dfrac{w_y^2 * e_{ij} + w_z * (w_z * e_{ij} - \overline{e}_{ij})}{(w_x + w_y)w_y} & |\overline{e}_{ij}| < T \\ a_{ij} & |\overline{e}_{ij}| \geq \overline{T} \end{cases}$ iii. $d_{ij} = e_{ij}$ In one embodiment, the choice of the option used for calculating $d_{ij}$ is signaled within the vector OP.

Thereafter, processing logic applies the inverse spatial transform to the vector $d_i$ to produce the sub-frame $\hat{z}_i$ (processing block 1205), and the remainder of the processing blocks 1206, 1207, 1208, and 1209 operate as their respective counterparts 209, 210, 211, and 212 in FIG. 2 to complete the process.

For the embodiments described above, the optional parameter vector OP or parts of it can be signaled by any module including, but not limited to, codec, camera, super-resolution processor etc. One simple way to construct the parameter vector OP is as follows: each choice is signaled using two elements in the vector. For the nth choice, $$OP(2*n - 1) = \begin{cases} 0, & \text{choice is not signalled} \\ 1, & \text{choice is signalled} \end{cases} \text{ and }$$

OP(2*n)=value representing the choice. OP(2*n) needs to be set and is used only when OP(2*n−1)=1.

The techniques described herein can be used to process a video sequence in any color representation including, but not limited to, RGB, YUV, YCbCr, YCoCg and CMYK. The techniques can be applied on any subset of the color channels (including the empty set or the all channel set) in the color representation. In one embodiment, only the 'Y' channel in the YUV color representation is processed using the techniques described herein. The U and V channels are filtered using a 2-D low-pass filter (e.g. LL band filter of Le Gall 5/3 wavelet).

The techniques described herein can be used to process only a pre-selected set of frames in a video sequence. In one embodiment, alternative frames are processed. In another embodiment, all frames belonging to one or more partitions of a video sequence are processed. The set of frames selected for processing can be signaled within OP.

In addition to the application of the techniques described herein on compressed/uncompressed video sequences, the techniques can also be applied to compressed video sequences that underwent post-processing such as Non-linear Denoising Filter. Furthermore, the techniques can be applied on video sequences that are obtained by super-resolving a low-resolution compressed/uncompressed video sequence. The techniques can also be applied on video sequences that are either already processed or will be processed by a frame-rate conversion module.

An Example of a Computer System

Figure 14:
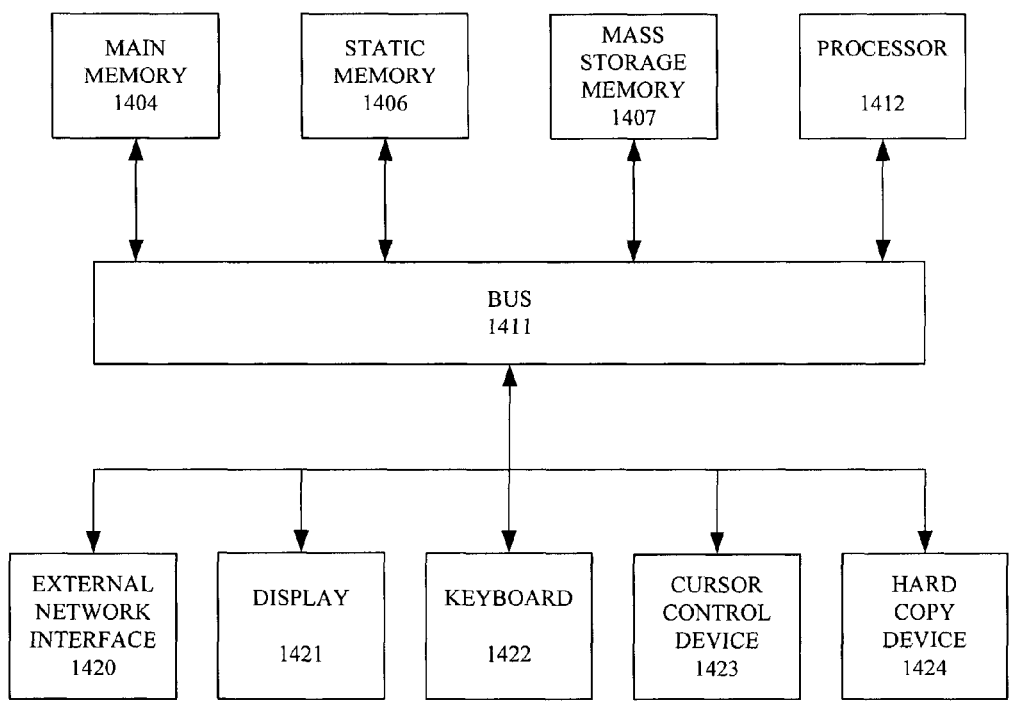
FIG. 14 is a block diagram of one embodiment of a computer system.

FIG. 14 is a block diagram of an exemplary computer system that may perform one or more of the operations described herein. Referring to FIG. 14, computer system 1400 may comprise an exemplary client or server computer system. Computer system 1400 comprises a communication mechanism or bus 1411 for communicating information, and a processor 1412 coupled with bus 1411 for processing information. Processor 1412 includes a microprocessor, but is not limited to a microprocessor, such as, for example, Pentium™, PowerPC™, Alpha™, etc.

System 1400 further comprises a random access memory (RAM), or other dynamic storage device 1404 (referred to as main memory) coupled to bus 1411 for storing information and instructions to be executed by processor 1412. Main memory 1404 also may be used for storing temporary variables or other intermediate information during execution of instructions by processor 1412.

Computer system 1400 also comprises a read only memory (ROM) and/or other static storage device 1406 coupled to bus 1411 for storing static information and instructions for processor 1412, and a data storage device 1407, such as a magnetic disk or optical disk and its corresponding disk drive. Data storage device 1407 is coupled to bus 1411 for storing information and instructions.

Computer system 1400 may further be coupled to a display device 1421, such as a cathode ray tube (CRT) or liquid crystal display (LCD), coupled to bus 1411 for displaying information to a computer user. An alphanumeric input device 1422, including alphanumeric and other keys, may also be coupled to bus 1411 for communicating information and command selections to processor 1412. An additional user input device is cursor control 1423, such as a mouse, trackball, trackpad, stylus, or cursor direction keys, coupled to bus 1411 for communicating direction information and command selections to processor 1412, and for controlling cursor movement on display 1421.

Another device that may be coupled to bus 1411 is hard copy device 1424, which may be used for marking information on a medium such as paper, film, or similar types of media. Another device that may be coupled to bus 1411 is a wired/wireless communication capability 1420 to communication to a phone or handheld palm device.

Note that any or all of the components of system 1400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

receiving an input video; and performing operations to reduce one or both of noise and flicker in the input video using spatial and temporal processing by applying a spatial transform to transform a sub-frame of a current frame of the input video into a spatial transform domain, thresholding spatial-transform coefficients of the sub-frame, applying a temporal transform with adaptive thresholding of the thresholded spatial-transform coefficients, inverse transforming spatial-transform coefficients to obtain a processed sub-frame, and combining the processed sub-frame with previously processed sub-frames belonging to the current frame to create a new frame of an output video,
wherein applying the spatial transform and the temporal transform comprises applying at least one pixel-adaptive warped transform to the sub-frame to create transform coefficients.

2. The method defined in claim 1 wherein the at least one pixel-adaptive warped transform comprises a 2-D separable DCT or a 2-D Hadamard transform.

3. The method defined in claim 1 wherein the adaptive thresholding includes applying spatially adaptive thresholds.

4. The method defined in claim 1 further comprising computing an adaptive threshold, and wherein performing adaptive thresholding comprises thresholding transform coefficients with the adaptive threshold.

5. A method comprising:
receiving an input video; and
performing operations to reduce one or both of noise and flicker in the input video using spatial and temporal processing, wherein performing the operations to reduce one or both of noise and flicker in the input video using spatial and temporal processing comprises:
transforming sub-frames of a current frame and a past frame using a spatial transform for each sub-frame,
thresholding spatial-transform coefficients for each transformed sub-frame with an adaptive threshold,
transforming thresholded spatial-transformed coefficients using a temporal transform,
thresholding temporal-transform coefficients for each transformed sub-frame with a threshold to create thresholded temporal-transformed coefficients,
inverse transforming the thresholded temporal-transform coefficients to form processed sub-frames in the pixel-domain, and
combining the processed sub-frames to create a new frame.

6. The method defined in claim 5 wherein the spatial transform is a warped transform.

7. The method defined in claim 5 wherein thresholding spatial-transform coefficients for each transformed sub-frame with an adaptive threshold comprises:
performing thresholding to coefficients generated from the subframe of the current frame using a first threshold;
performing thresholding to coefficients generated from the subframe of the past frame using a second threshold, the second threshold being computed independently of the first threshold.

8. The method defined in claim 5 further comprising computing one or more adaptive thresholds, and wherein thresholding transform coefficients for each transformed sub-frame with an adaptive threshold comprises thresholding transform coefficients for each transformed sub-frame with one of the one or more adaptive thresholds.

9. The method defined in claim 5 further comprising:
applying at least one forward transform to the new frame to convert data of the new frame into coefficients in a transform domain;
performing at least one data processing operation on the coefficients; and
applying at least one inverse transform to the coefficients after data processing.

10. The method defined in claim 9 wherein the at least one data processing operation includes one or more of a group consisting of unsharp masking and applying an enhancement factor to the coefficients.

11. A method comprising:
receiving an input video; and
performing operations to reduce one or both of noise and flicker in the input video using spatial and temporal processing, wherein the operations comprise:
selecting a sub-frame at certain pixels from a current frame of input video and for finding another sub-frame from a past frame of output video,
selecting a warped spatial transform and for transforming the sub-frames into a spatial transform domain,
deriving an adaptive threshold and thresholding spatial-transform coefficients of the sub-frames from the current frame and the past frame,
applying a temporal transform to thresholded spatial-transform coefficients and thresholding a selected sub-set of the temporal-transform coefficients,
inverse transforming temporal-transform coefficients first temporally and then spatially to obtain a processed sub-frame, and
combining the processed sub-frame with previously processed sub-frames belonging to current frame to create a new frame of an output video.

12. The method defined in claim 11 wherein the warped spatial transform is pixel-adaptive and the adaptive threshold is detail-preserving.

13. The method defined in claim 11 wherein the sub-frame of the past frame is located based on satisfying a criterion.

14. The method defined in claim 13 wherein the criterion is based on one of a group consisting of the number of the pixel; a minimum value among all values of a p-norm between the selected sub-frame of the current frame and the selected sub-frame of the past frame; a minimum value among values, within a range limited by width of the past frame and horizontal and vertical offsets, of a p-norm between the selected sub-frame of the current frame and the selected sub-frame of the past frame; a minimum value among values, within a range limited by width of the past frame and randomly-chosen horizontal and vertical offsets, of a p-norm between the selected sub-frame of the current frame and the selected sub-frame of the past frame.

15. The method defined in claim 11 wherein deriving the adaptive threshold and thresholding spatial-transform coefficients of the sub-frames from the current frame and the past frame comprises using hard thresholding in which coefficients are set to zero if magnitude of transform coefficients is less than a threshold.

16. The method defined in claim 11 wherein deriving the adaptive threshold and thresholding spatial-transform coefficients of the sub-frames from the current frame and the past frame comprises using soft thresholding.

17. The method defined in claim 11 further comprising:
selecting an output video frame of the output video that best matches another frame from the input video; and
performing the operations using the output video frame as the past frame.

18. The method defined in claim 11 further comprising setting the sub-frames to be regular at every pixel.

19. The method defined in claim 11 further comprising selecting adaptively a transform for each sub-frame.

20. The method defined in claim 11 further comprising selecting a sub-frame adaptively at each pixel.

21. The method defined in claim 11 further comprising computing one or more adaptive thresholds, and wherein thresholding transform coefficients for each transformed sub-frame with an adaptive threshold comprises thresholding transform coefficients for each transformed sub-frame with one of the one or more adaptive thresholds.

22. The method defined in claim 21 further comprising adaptively selecting the transform for a sub-frame selected at each pixel.

23. The method defined in claim 11 further comprising sending a vector of operational parameters.

24. The method defined in claim 11 wherein applying the temporal transform to spatial-transform coefficients and thresholding a selected sub-set of the temporal-transform coefficients comprises:
forming a first matrix/vector from thresholded spatial-transform coefficients of the sub-frames from the current frame and the past frame, and
applying thresholding to a selected sub-set of coefficients in the first matrix/vector to create a second matrix/vector;
and further wherein inverse transforming temporal-transform coefficients first temporally and then spatially to obtain a processed sub-frame comprises
applying an inverse temporal transform to the second matrix/vector to generate a third matrix/vector, and
applying an inverse spatial transform to the third matrix/vector to produce the processed sub-frame.

25. A method comprising:
receiving an input video; and
performing operations to reduce one or both of noise and flicker in the input video using spatial and temporal processing, wherein performing the operations to reduce one or both of noise and flicker in the input video using spatial and temporal processing comprises:
transforming sub-frames of a current frame and a past frame using a spatial transform for each sub-frame,
transforming spatial-transformed coefficients using a temporal transform,
thresholding temporal-transform coefficients for each transformed sub-frame with a threshold to create thresholded temporal-transformed coefficients,
inverse transforming the thresholded temporal-transform coefficients to form processed sub-frames in the pixel-domain, and
combining the processed sub-frames to create a new frame.

26. A method comprising:
receiving an input video; and
performing operations to reduce one or both of noise and flicker in the input video using spatial and temporal processing, wherein the operations comprise:
forming a new frame from a current frame of input video and a past frame of output video,
processing sub-frames of the new frame and the current frame by:
generating first and second sub-frames using pixels from the current and new frames, respectively, using a vector formed from each pixel in the first and second sub-frame, respectively, based on a sub-frame type for each pixel,
selecting a warped spatial transform and for transforming the first and second sub-frames into a spatial transform domain,
deriving an adaptive threshold and thresholding transform coefficients of the first sub-frame,
generating a matrix/vector using thresholded transform coefficients and coefficients generated from the second sub-frame, and
inverse transforming coefficients in the matrix/vector to produce a processed sub-frame, and
combining the processed sub-frame with previously processed sub-frames belonging to current frame to create a new frame of an output video.

27. The method defined in claim 26 wherein the current frame and the past frame include channel information of the frames for only a subset of all channels of a multi-dimensional color representation.

28. A comprising:
receiving an input video; and
performing operations to reduce one or both of noise and flicker in the input video using spatial and temporal processing, wherein the operations comprise:
selecting a sub-frame at certain pixels from a current frame of input video;
selecting a warped spatial transform for transforming the sub-frame into a spatial transform domain,
deriving an adaptive threshold and thresholding spatial-transform coefficients of the sub-frame from the current frame,
inverse transforming spatial-transform coefficients to obtain a processed sub-frame, and
combining the processed sub-frame with previously processed sub-frames belonging to current frame to create a new frame of an output video.

29. An article of manufacture having one or more non-transitory computer readable storage media storing instructions therein which, when executed by a system, causes the system to perform a method comprising:
receiving an input video; and
performing operations to reduce one or both of noise and flicker in the input video using spatial and temporal processing by
applying a spatial transform to transform a sub-frame of a current frame of the input video into a spatial transform domain,
thresholding spatial-transform coefficients of the sub-frame,
applying a temporal transform with adaptive thresholding of the thresholded spatial-transform coefficients,
inverse transforming spatial-transform coefficients to obtain a processed sub-frame, and
combining the processed sub-frame with previously processed sub-frames belonging to the current frame to create a new frame of an output video,
wherein applying the spatial transform and the temporal transform comprises applying at least one pixel-adaptive warped transform to the sub-frame to create transform coefficients.

30. The article of manufacture defined in claim 29 wherein the at least one pixel-adaptive warped transform comprises a 2-D separable DCT or a 2-D Hadamard transform.

31. An article of manufacture having one or more non-transitory computer readable storage media storing instructions therein which, when executed by a system, causes the system to perform a method comprising:
receiving an input video; and
performing operations to reduce one or both of noise and flicker in the input video using spatial and temporal processing, wherein performing the operations to reduce one or both of noise and flicker in the input video using spatial and temporal processing comprises:
transforming sub-frames of a current frame and a past frame using a spatial transform for each sub-frame,
thresholding spatial-transform coefficients for each transformed sub-frame with an adaptive threshold,
transforming thresholded spatial-transformed coefficients using a temporal transform, thresholding temporal-transform coefficients for each transformed sub-frame with a threshold to create thresholded temporal-transformed coefficients, inverse transforming the thresholded temporal-transform coefficients to form processed sub-frames in the pixel-domain, and combining the processed sub-frames to create a new frame.

32. The article of manufacture defined in claim 31 wherein the spatial transform is a warped transform.

33. The article of manufacture defined in claim 31 wherein thresholding spatial-transform coefficients for each transformed sub-frame with an adaptive threshold comprises:

performing thresholding to coefficients generated from the subframe of the current frame using a first threshold;

performing thresholding to coefficients generated from the subframe of the past frame using a second threshold, the second threshold being computed independently of the first threshold.

34. An article of manufacture having one or more non-transitory computer readable storage media storing instructions therein which, when executed by a system, causes the system to perform a method comprising:

receiving an input video; and performing operations to reduce one or both of noise and flicker in the input video using spatial and temporal processing, wherein the operations comprise:

selecting a sub-frame at certain pixels from a current frame of input video and finding another sub-frame from a past frame of output video, selecting a warped spatial transform and transforming the sub-frames into a spatial transform domain, deriving an adaptive threshold and thresholding spatial-transform coefficients of the sub-frames from the current frame and the past frame, applying a temporal transform to the spatial-transform coefficients and thresholding a selected sub-set of the temporal-transform coefficients, inverse transforming the temporal-transform coefficients first temporally and then spatially to obtain processed sub-frames belonging to both current frame and past frame, and combining processed sub-frames belonging to current frame to create a new frame of an output video.

35. The article of manufacture defined in claim 34 wherein the warped spatial transform is pixel-adaptive and the adaptive threshold is detail-preserving.

* * * * *